C. W. HART.
CLUTCH.
APPLICATION FILED MAR. 17, 1909.
926,184.
Patented June 29, 1909.
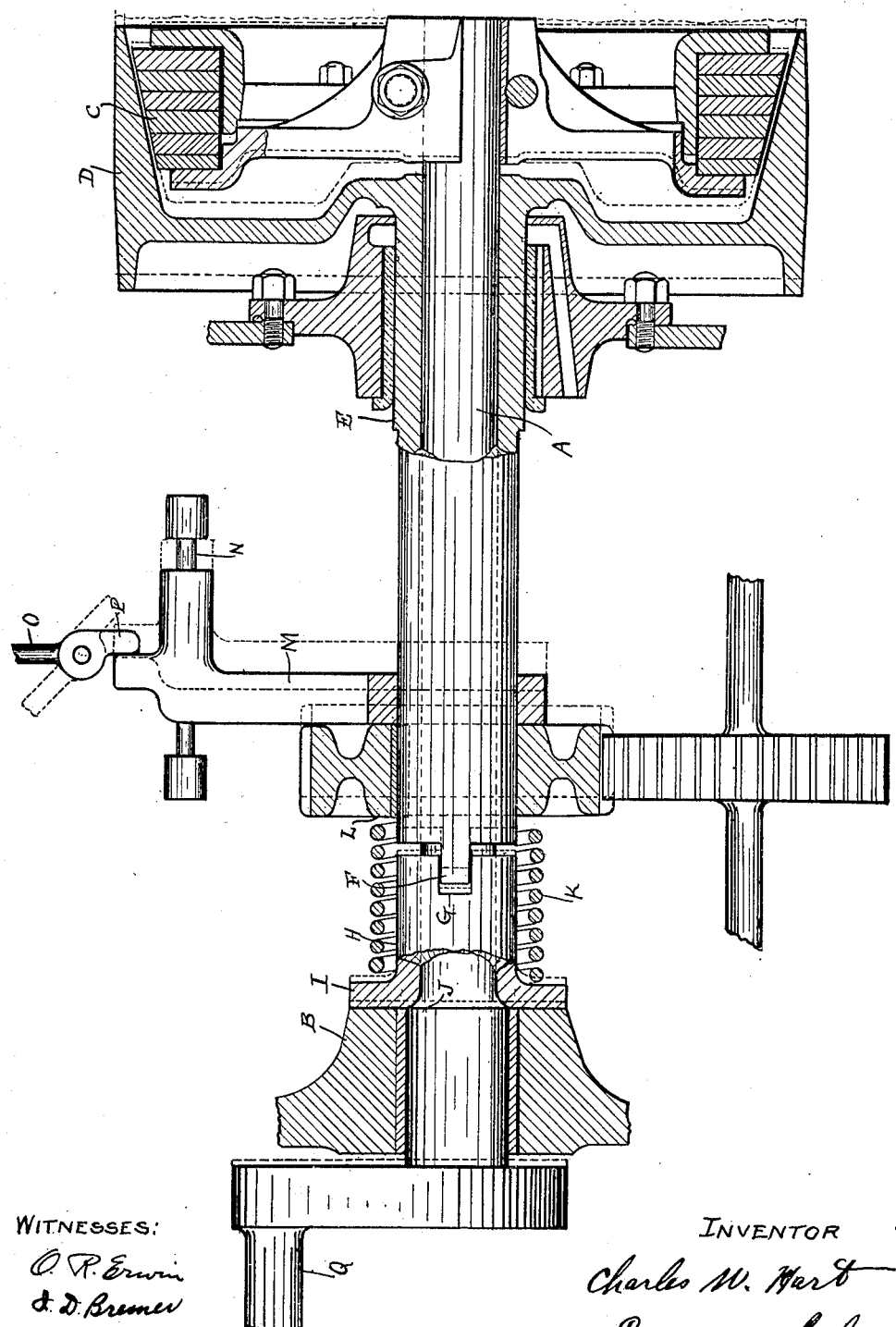
WITNESSES:
O. R. Erwin
J. D. Bremer
INVENTOR
Charles W. Hart
By Erwin & Wheeler
ATTORNEYS.

UNITED STATES PATENT OFFICE.

CHARLES W. HART, OF CHARLES CITY, IOWA.

CLUTCH.

No. 926,184.   Specification of Letters Patent.   Patented June 29, 1909.

Application filed March 17, 1909. Serial No. 483,892.

*To all whom it may concern:*

Be it known that I, CHARLES W. HART, a citizen of the United States, residing at Charles City, county of Floyd, and State of Iowa, have invented new and useful Improvements in Clutches, of which the following is a specification.

My invention relates to improvements in clutches.

The object of my invention is to provide a form of clutch, particularly a friction clutch, in which end thrust upon the driving shaft will be avoided, not only when the clutch is set for power transmission, but also when it is in position of release, and in which there will be no frictional contacts in or upon the clutch setting mechanism during power transmission, and such contacts, when the clutch is in releasing position, will be utilized to stop the motion of the driven member.

In the following description, reference is had to the accompanying drawing, in which—

Figure 1 is a side view, part in vertical section, of my improved clutch in releasing position, with dotted lines indicating the gripping position.

In all ordinary engines, the crank shaft A is allowed a slight longitudinal movement to prevent binding. This is utilized in my improved clutch to relieve the shaft from end thrust when the shifting lever is operated. The shaft A is mounted in a frame bearing at B and is provided with a conical driving clutch member C, which is adapted to move into and out of frictional contact with the conically tapered rim of a driven member D. This driven member is provided with a sleeve E, loose on the shaft, and having an end projection F, engaging in a corresponding notch G in a loose sleeve H. The sleeve H has an end flange I, which is adapted to bear, either against a shoulder J on the shaft A, or against the end of the frame bearing B. A spring K is interposed between the flange I and a member L on the sleeve E, which may constitute a transmission member such as a pulley or gear wheel.

The pressure of spring K upon the member L tends to push the driven member D of the clutch into contact with member C, and the pressure upon member C pushes shaft A to the right, or longitudinally in its bearings, sufficiently to bring shoulder J into contact with flange I and push said flange away from bearing member B, the sleeve H then revolving with the shaft A. To disengage the clutch, the driven member D is retracted by a member M, slidingly mounted upon a frame rod N, and actuated from a shifting lever O and cam P, which transmits motion through the member M to the member L to retract sleeve E and clutch member D. The shaft A is then free to move to the left or in the direction of the end occupied by the crank Q, and the sleeve H moves in the same direction until flange I bears against the bearing member B, which serves as a brake and checks the motion of sleeve H and also of sleeve E by reason of the interacting lug F. The shoulder J of the shaft is then out of pressure contact with flange I and the shaft A therefore receives no end thrust from the sleeve H. The friction of member L upon member M also serves as a brake to stop the motion of the driven connections.

With this construction, any inaccuracy of structure which would tend to prevent the member L from contacting with the shaft when in motion and with the bearing when at rest, will tend to correct itself, for in case the large portion of the shaft is too long, so that the member I remains in contact therewith when the driven member of the clutch is at rest, the friction of the member I upon the shaft shoulder will wear away both surfaces until member I engages the bearing. If the bearing is too long, the motion of I when the clutch is set, will wear away the opposing surfaces until the member I seats against the shaft shoulder.

It is not absolutely essential that the sleeves H and E should interlock, but this is desirable to obviate any tendency to wind or unwind the spring coil when the driven member is uncoupled and the member I is serving as a brake.

Having thus described my invention, what I claim as new, and desire to secure by Letters Patent is—

1. In a clutch, the combination with an axially movable driving shaft, a driving clutch member fast on the shaft, and a bearing member, of a driven clutch member interposed between the driving clutch member and the bearing member, another interposed member having interlocking connection with the driven clutch member adapted to permit a relative longitudinal movement, a clutch setting spring interposed between portions of the driven clutch member and the interlocking member, and means for retracting the driven member from the driving member, said driving shaft being shouldered, and said interlocking member being arranged to bear under spring pressure, either against said shoulder or against the bearing member in accordance with the position of the shaft in the bearing.

2. In a clutch, the combination with an axially movable driving shaft, a driving clutch member fast on the shaft, and a bearing member, of a driven clutch member interposed between the driving clutch member and the bearing member, another interposed member, a clutch setting spring interposed between portions of the driven clutch member and the interposed member, and means for retracting the driven member from the driving member, said driving shaft being shouldered, and said interposed member being arranged to bear under spring pressure either against said shoulder or against the bearing member in accordance with the position of the shaft in the bearing.

In testimony whereof I affix my signature in the presence of two witnesses.

CHARLES W. HART.

Witnesses:
 LEVERETT C. WHEELER,
 O. R. ERWIN.